United States Patent [19]

Eddleman

[11] 4,149,951

[45] Apr. 17, 1979

[54] FRAME FILTER PRESS AND APPARATUS

[76] Inventor: William L. Eddleman, 6638 Westchester, Houston, Tex. 77005

[21] Appl. No.: 908,405

[22] Filed: May 22, 1978

[51] Int. Cl.² .......................... B01D 13/02; C25C 1/06
[52] U.S. Cl. .................................. 204/257; 204/252; 204/253; 204/301; 204/93; 204/151
[58] Field of Search ............... 204/252, 253, 257, 258, 204/296, 301, 93, 151

[56] References Cited

U.S. PATENT DOCUMENTS

| | | | |
|---|---|---|---|
| 1,954,664 | 4/1934 | Cain | 204/93 X |
| 2,865,823 | 12/1958 | Harris et al. | 204/151 X |
| 3,124,520 | 3/1964 | Juda | 204/151 X |
| 3,481,851 | 12/1969 | Lancy | 204/180 P |
| 3,944,477 | 3/1976 | Areade | 204/296 X |

FOREIGN PATENT DOCUMENTS 1081046 8/1967 United Kingdom ................. 204/296

Primary Examiner—Arthur C. Prescott
Attorney, Agent, or Firm—Sigalos & Levine

[57] ABSTRACT

Apparatus for removing metallic and acidic contaminants from a pickling liquor comprising first and second cells for initially receiving water, a third cell interposed between said first and second cells for receiving said pickle liquor, permeable membrane means separating said third cell from said first and second cells and which permits transfer therethrough of said metal ions and acid cations, an anode mounted in said first cell, and a cathode mounted in said second cell whereby when a D. C. current is passed between said anode and cathode a metallic complex is formed at said cathode, a purified acid is formed at said anode and purified pickle liquor is left in said center cell.

10 Claims, 8 Drawing Figures

FRAME FILTER PRESS AND APPARATUS

BACKGROUND OF THE INVENTION

In galvanizing operations, the metal usually steel, to be coated with zinc must be first cleaned to remove rust, dirt, scale, and other contaminating materials. Such cleaning permits the zinc coating to adhere successfully to the steel surface. In such galvanizing plants, it is conventional to use a vessel charged with acid to clean many forms of steel. Normally, the acid has a pH of about 1 and, typically, a strong acid is used; the most common acid beig sulphuric acid, though hydrochloric acid can be used. The vessel or container is heated to something less than boiling, since elevation of the temperature increases the chemical activity occurring in the tank and permits more rapid cleaning.

Sometimes, the galvanizing process will not be carried on perfectly and, as a consequence, the partially galvanized steel must be cleaned. Thus, it is necessary to return the incorrectly galvanized steel to the cleaning tank where it will be stripped of the zinc coating thereon.

After some period of time, the cleaning vessel contains a substantial amount of dirt, acidic contaminants, and various quantities of metal ions. The metal ions typically include iron and traces of metal elements such as manganese, copper, chromium, lead, tin, molybdenum, titanium, nickel, strontium, and zinc. Other trace elements may also be found in the acid bath after the cleaning of metals. This reduces the effectiveness of the acid bath. When the acid bath becomes substantially contaminated, it is no longer able to properly clean the steel. It has been, heretofore, necessary to dump all of such contaminated acid from the cleaning tank and replace it with a fresh batch of acid. However, in recent years with concern about the environment rising, it has become exceedingly difficult to dispose of large volumes, conventionally, of spent acid. While the acid may not be usable commercially for cleaning the steel at this point, it remains a strong acid and most local laws forbid the dumping of a strong acid laden with metal ions into the sewer system. One alternative has been to cart the spent or contaminated acid away to an authorized disposal facility where it might be combined with available waste bases for neutralization of the acids. As can be appreciated, such disposal techniques are quite expensive.

To avoid such costly dumping, purification of the spent liquor has been attempted. One method contemplates placing an anode and a cathode in the pickle liquor and passing a D.C. current through the terminals and the bath. Elemental metals can be recovered in the vicinity of the cathode by the use of an electromagnet at or above the surface of the pickle liquor. These materials attach to the cathode momentarily, but do not plate thereon as that term is ordinarily understood in the art. The current flow through the pickle liquor changes the valence of the metal ions at the anode enabling the formation of insoluble salts or oxides which can be recovered from the pickle liquor by filtration. In this regard, see U.S. Pat. No. 3,801,481, issued Apr. 2, 1974 to the present inventor.

Another method is disclosed in U.S. Patent Application Ser. No. 732,479 filed Oct. 14, 1976 in which a tank is used which is divided preferably down the center by a permeable membrane. The membrane has pores which permits metal ions to pass therethrough in one direction and acid cations in the opposite direction, but does not permit passage of water. An anode is placed on one side of the membrane and a cathode is placed on the other side. A D.C. current source is connected to the terminals and the current flow through the bath is established. Elemental metals collect and adhere to the cathode. Acid is concentrated and recovered at the anode. Thus the impure pickle liquor is continually pumped to the vicinity of the cathode and purified acid is recovered from the anode side. This technique recovers far more than half of the metal at the cathode. The remaining acidic liquid in the vicinity of the cathode is transferred to a precipitating tank where zinc oxide waste known as "skimmings" can be introduced to raise the pH. A precipitating technique can then be used to recover all the remaining metal ions.

SUMMARY OF THE INVENTION

The present invention is an improvement over the apparatus of the prior art for purifying spent pickling and/or metal cleaning liquor in a rapid and economical manner.

Briefly stated, the invention relates to apparatus for removing metal ions and acid cations from the liquor of a pickling and/or metal cleaning tank comprising first and second cells for initially receiving water, a third cell interposed between said first and second cells for receiving pickle liquor, permeable membrane means separating said third cell from said first and second cells and which permits transfer therethrough of said metal ions and acid cations, an anode mounted in said first cell, and a cathode mounted in said second cell whereby when a D.C. current is passed between said anode and cathode, a metallic complex is formed at said cathode, a purified acid is formed at said anode and purified pickle liquor is left in said center cell.

The permeable membrane may be a single membrane folded over each pickle liquor cell to provide a liquid separation from each cell on either side thereof with spacers inserted in said pickle liquor cells to prevent the membrane from collapsing into the cell and preventing flow of liquid therethrough.

The invention further contemplates a plurality of individual cells for receiving said pickle liquor, a water receiving cell interposed between any two of said pickle liquor cells, and a permeable membrane separating each of said pickle liquor cells from said water cells whereby an array of cells is formed with every other cell a pickle liquor cell and the remaining cells are alternating positive and negative cells. The cells are arranged in a press which maintains them in such close abutting relationship that a liquid tight seal is formed between the cells.

BRIEF DESCRIPTION OF THE DRAWINGS

These and other objects and advantages of the present invention will be disclosed in the course of the following specification, reference being had to the accompanying drawings in which.

DETAILED DESCRIPTION

Figure 1:
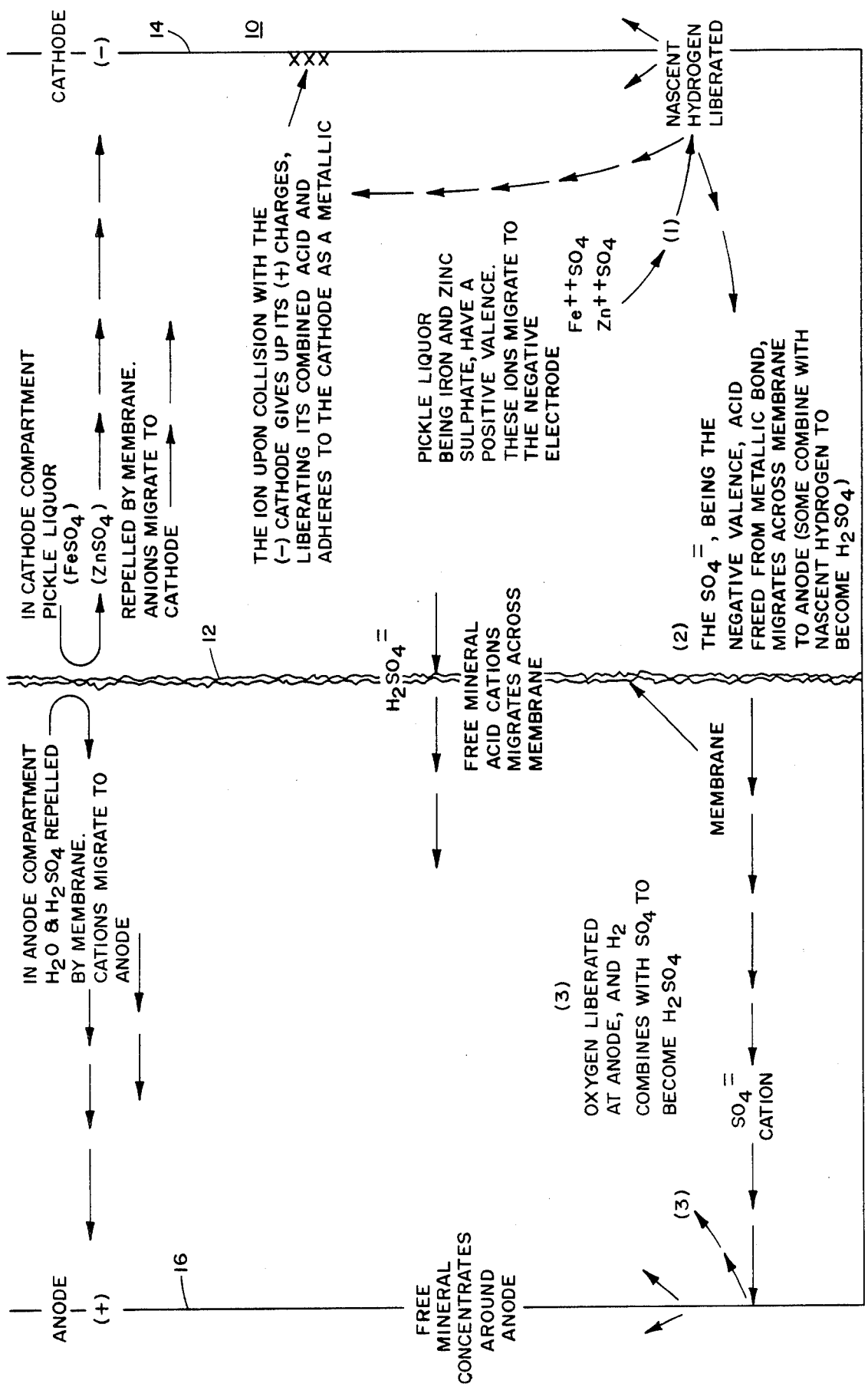
FIG. 1 is a diagram illustrating the process by which the cells of the prior art work electrochemically and electromagnetically to effect electrodialysis.

FIG. 1 illustrates the process by which the prior art apparatus is able to remove the contaminates from pickle liquor. The apparatus comprises a cell or tank 10 divided by a permeable membrane 12 which permits anions and cations to pass therethrough, but prevents water from doing so. Water is generally introduced in the anode compartment and the pickle liquor in the cathode compartment. The pickle liquor contains ferric sulphate ($FeSO_4$) and zinc sulphate ($ZnSO_4$) which have a positive valence and thus these ions migrate to the negative electrode when a D.C. current is applied between the anode and the cathode. The ions, upon collision with the cathode, give up their positive charges, liberate their combined acid and nascent hydrogen and adhere to the cathode as a metallic coating.

The sulphate ions ($SO_4^-$) being a negative valence, is freed from the metallic bond and migrates across the membrane to the anode. Some of these sulphate ions combine with the nascent hydrogen to become hydrogen sulphide ($H_2SO_4$). The $SO_4^-$ cations that migrate through the membrane combines with the hydrogen in the water to become hydrogen sulphide ($H_2SO_4$). Thus the free mineral acid concentrates around the anode while the metallic ions adhere to the cathode as a metallic.

Figure 2:
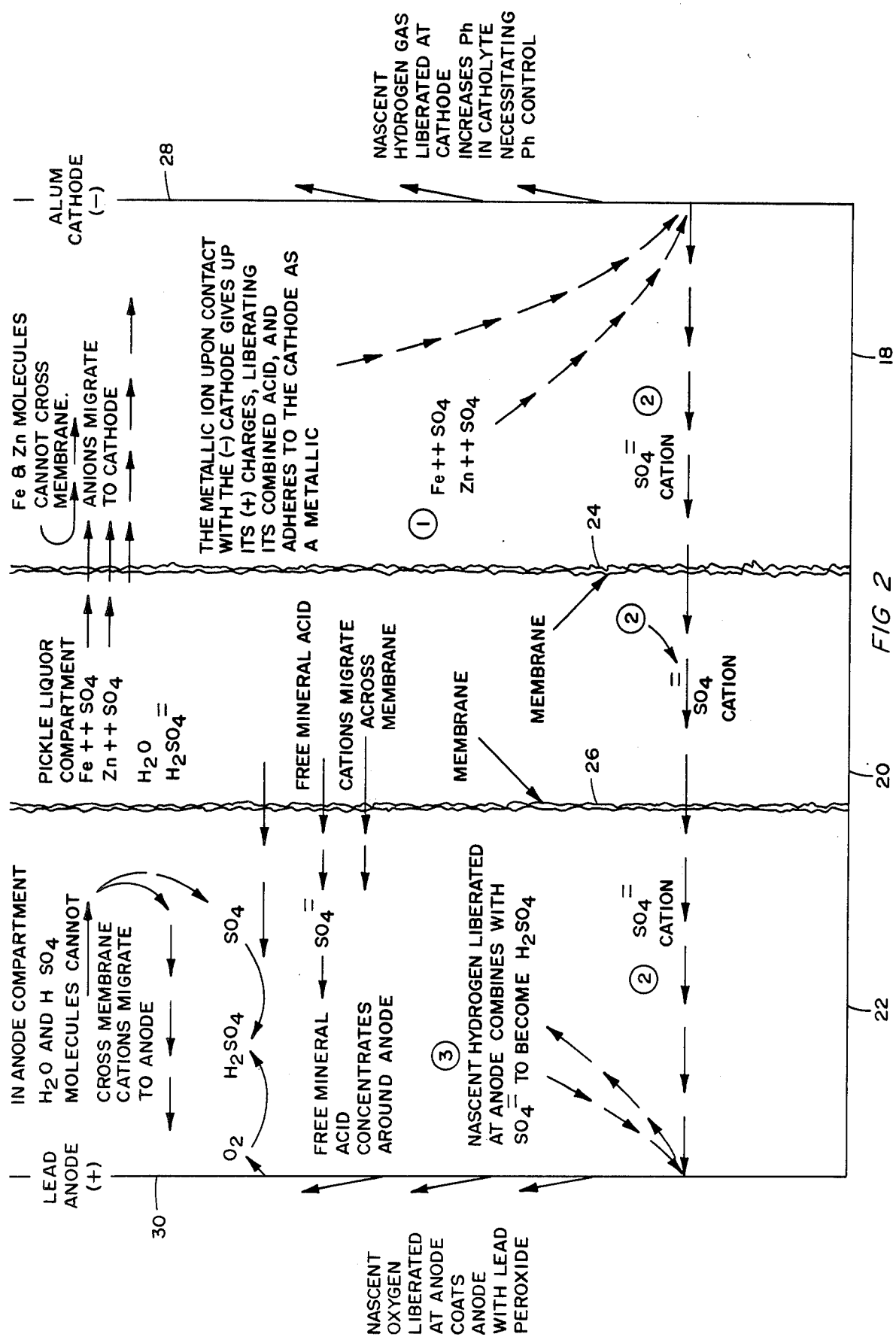
FIG. 2 is a diagram illustrating the triple cell arrangement of the present invention and the manner in which it functions electrochemically and electromagnetically to effect electrodialysis.

FIG. 2 illustrates the process of the present invention wherein the pickle liquor cell has the anode and cathode cell on either side thereof separated by a permeable membrane. The preferred anode material is lead and the preferred cathode material is aluminum. The pickle liquor is contained in the center compartment with both the anode and cathode side of the membrane initially being filled with water. The anode and cathode are then energized with a D.C. current and, once established, the acid cations transfer through the membrane to the cell where the anode is located while the metallic ions transfer through the membrane to the side of the tank where the cathode is located. Thus, the anions migrate through one membrane to the cathode while the free mineral acid cations migrate across the other membrane to the lead anode. Again, the metallic ion, upon contact with the cathode, gives up its positive charges, liberating its combined acid and adheres to the cathode as a metallic. In the anode cell, the sulphate cations combine with hydrogen liberated at the anode to form hydrogen sulphide, ($H_2SO_4$). A free mineral acid thus concentrates around the anode. The water molecules and the hydrogen sulphide molecules can not cross the membrane to the pickle liquor compartment. In like manner, in the cathode compartment, the iron and zinc molecules can not cross the membrane but migrate to the cathode.

Figure 3:
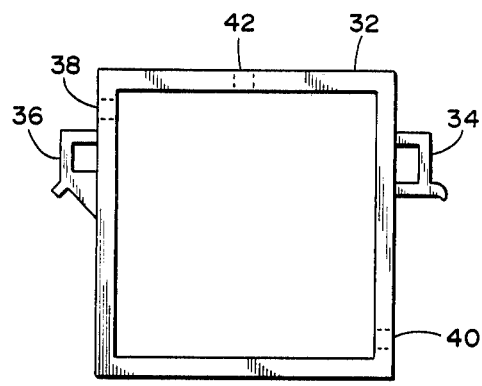
FIG. 3 is a front view of a frame which can be used as an electrode cell for initially receiving water and either an anode or a cathode therein.

The individual cells are designed to be used in a press with an array of other cells and are generally of a size of approximately one inch in thickness and 30 inches in width to 60 inches in length. A typical cell which may be used as an anode cell is shown in FIG. 3. It comprises a frame 32 having handles or ears 34 and 36 thereon for mounting in a press. The frame has in one side thereof a fluid inlet orifice 38 and at the bottom thereof a fluid outlet orifice 40. In the top thereof is an opening 42 for the mounting of an anode.

Figure 4:
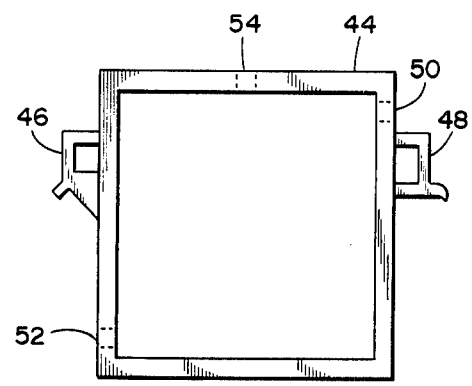
FIG. 4 is a front view of a frame which can be used as the other electrode cell for initially receiving water therein and may contain an electrode of the opposite polarity of the other cell.

In like manner, a similar frame is shown in FIG. 4 which can be used as a cathode cell. Again, frame 44 has thereon handles or ears 46 and 48 for mounting in a frame press. It has therein an opening 50 for a fluid inlet orifice and an opening 52 for a fluid outlet orifice. In like manner, it also has an opening 54 in the top thereof wherein a cathode may be installed.

Figure 5:
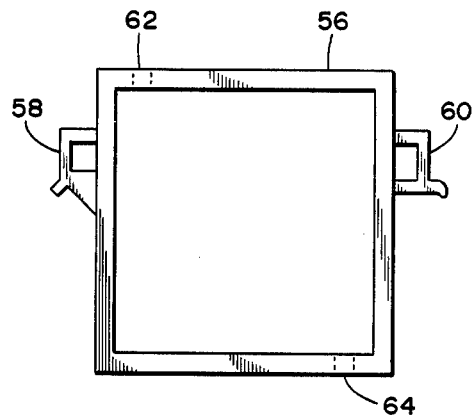
FIG. 5 is a front view of a frame which can be used as the pickle liquor cell and illustrates openings for the inflow to and outflow from the cell.

FIG. 5 illustrates a frame which may be used as a pickle liquor cell. Frame 56 has thereon handles or ears 58 and 60 which again are used to mount the frame in a press. Frame 56 has an opening 62 in the top thereof which serves as an inlet orifice for the pickle liquor and an opening 64 at the bottom thereof which serves as an outlet orifice for the pickle liquor.

Figure 6:
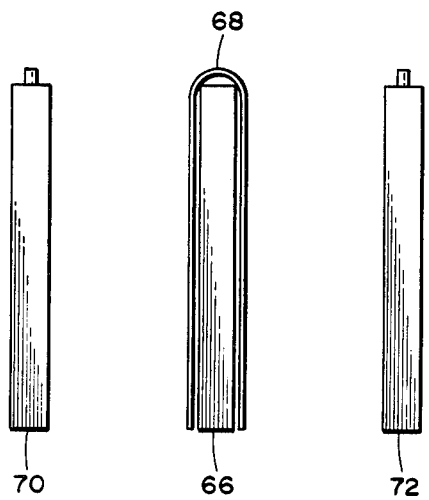
FIG. 6 is an exploded view of a three cell section illustrating the center or pickle liquor cell being covered with a membrane which is folded over the top thereof and extends down to cover both sides thereof and thus separates the pickle liquor cell from the anode and cathode cells on either side thereof.

FIG. 6 is an exploded view of a typical cell array comprising a pickle liquor cell 66 having a permeable membrane 68 folded thereover to cover both sides to separate frame 66 from the adjacent anode frame 70 and the cathode frame 72. It will be understood that FIG. 6 is for illustrative purposes only and that in actual operation, anode frame 70 and cathode frame 72 are in abutting relationship with frame 66 and are pressed tightly together to form a liquid tight seal between the cells or frames.

Figure 7:
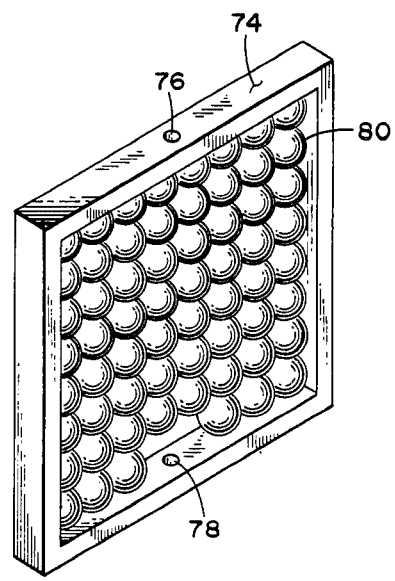
FIG. 7 is a perspective view of a frame being used as a pickle liquor cell and which has therein spacers which prevent the membrane folded thereover from collapsing within the cell and thus preventing flow of the pickle liquor.

The pressure applied to the anolyte and catholyte cells 70 and 72 is greater than the pressure of the pickle liquor in pickle liquor cell 66 shown in FIG. 6. Thus, means must be established for preventing the membrane 68 from being pressed inwardly on both sides of the pickle liquor cell 66 and thus shutting off the flow of pickle liquor. FIG. 7 illustrates a pickle liquor cell 74 having an orifice 76 in the top thereof for the introduction of pickle liquor and an orifice 78 in the bottom thereof for removal of the pickle liquor. Also, within frame 74 is a plurality of spacing means 80 in the form of spheres or balls which are of a diameter equal to or less than the thickness of frame or cell 74. As stated earlier, these cells or frames 74 may be from one to one and a half inches thick. Thus, when the pressure on either side of the pickle liquor cell increases and forces membrane 68, as shown in FIG. 6, inwardly, the membrane is supported by spacers 80 and prevented from closing the cell or frame 74 to the flow of pickle liquor and allow it to be distributed from the top of the frame through the spaces left by the spacers 80 down to the outlet orifice 78.

The membrane used must be one that permits the metallic and acidic contaminants (anions and cations) to pass therethrough from the spent pickle liquor to the respective electrodes in the anode and cathode cells, but which blocks water and water of hydration from passing therethrough. The preferred membranes meeting these criteria are the open-celled microporous polymer films disclosed and described in U.S. Pat. No. 3,679,538 which are commercially available from the Celanese Corporation under the trademark CELGARD. These are microporous polypropylene films which are inherently hydrophobic and specially processed to provide a pore structure which provides a barrier to water. As stated in U.S. Pat. No. 3,679,538, films made of other olefin polymers such as polyethylene, poly-3-methyl butene-1, and the like, and copolymers thereof can also be used. The films have a reduced bulk density as compared to the bulk density of the corresponding films having no open-celled structure, a crystallinity of above about 30 percent, a pore size of less than 5,000 Angstroms, and a nitrogen flux of greater than 35.4 and are prepared, as discussed in U.S. Pat. No. 3,679,538, by the consecutive steps of cold stretching, hot stretching, and heat-setting a non-porous, crystalline, elastic film made of a polymer discussed above.

An array of cells may be formed with every other cell a pickle liquor cell, and the remaining cells alternating positive and negative cells to enable a much more efficient and economical operation for removing the contaminants from the pickle liquor on a continuous basis.

Figure 8:
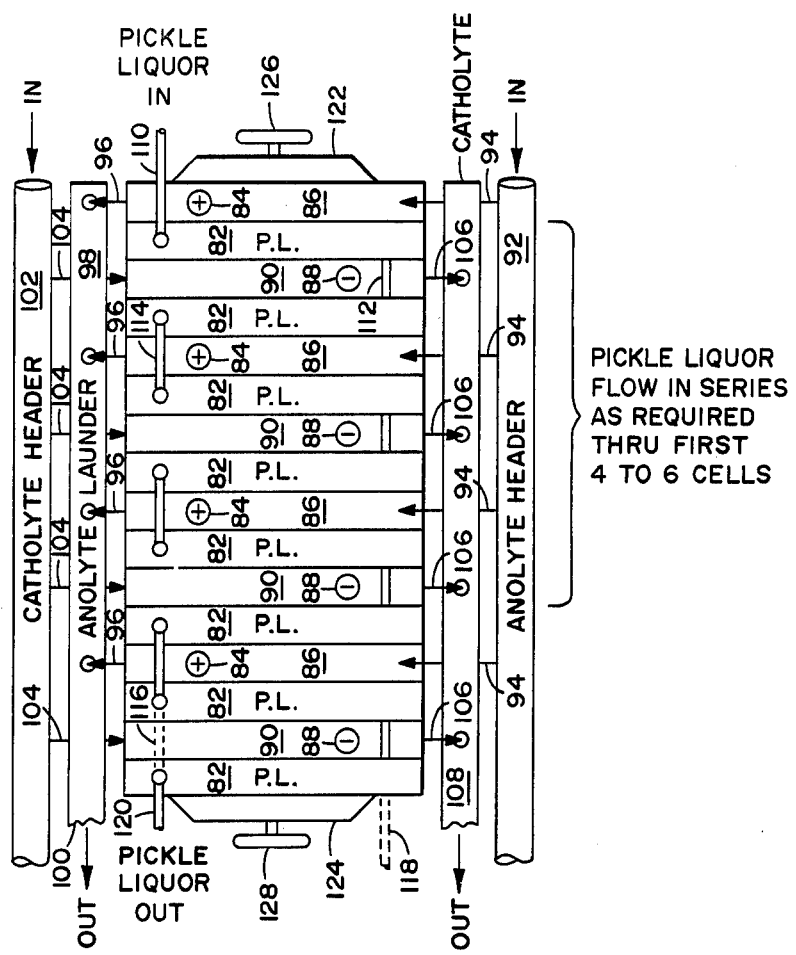
FIG. 8 illustrates the manner in which a plurality of the cells may be arranged in a press for continuous operation with the water and pickle liquor being coupled to the appropriate cells for proper operation thereof.

As shown in FIG. 8, a plurality of individual cells cells are interposed between each of said pickle liquor cells and the permeable membrane separates each pickle liquor cell from each of said water cells as shown in FIG. 6. A current receiving anode 84 is mounted in alternate ones of the water receiving cells 86. A current receiving cathode 88 is mounted in the remaining alternate water cells 90 and an appropriate D.C. source, not shown is coupled to the anodes and cathodes with the proper polarity. Water for the anode cells is coupled into an anolyte header 92 and from thence in parallel via connections 94 to each of the anode cells 86. The output of the anode cells 86 on lines 96 is coupled to a laundered anolyte tank 98 from which the free mineral acid may be removed at outlet 100.

In like manner, the water for the catholyte is transferred in to a catholyte header 102 from whence it is transferred in parallel to the cathode cells 90 via connections 104. The output of the cathode cells is coupled in parallel through connections 106 to an outlet line 108 from which the catholyte may be drained.

The pickle liquor is entered into the first cell 82 through inlet connection 110, passes through the cell and out the bottom thereof on the opposite side through connection 112 to the second pickle liquor cell 82 thence up through the cell to the top thereof and out connection 114 to the next pickle liquor cell 82. Thus, the pickle liquor cells 82 are in series arrangement with the liquid passing from one of the cells to another. However, as the liquor passes in series from one cell to another, the chemical reaction is taking place at a faster rate inasmuch as the free mineral acids are concentrating around the anode and the cations are being released or liberated at the cathode. Therefore, after the first 4 to 6 pickle liquor cells have been used in series, they may then be connected in parallel as shown by the dashed lines 116 and 118. The pickle liquor with the contaminants removed, is taken from the frame press at outlet 120 for reuse as needed.

Any type of frame press may be used to hold the frames in their abutting relationship as shown in FIG. 8. Thus, plates 122 and 124 may be attached to a rack, not shown and screw thread wheels 126 and 128 used to tighten the plates 122 and 124 against the outer cells which, as shown in FIG. 8 for purposes of illustration only, are the pickle liquor cell 82 and the anode cell 86. The press therefore, holds the plates in a liquid type relationship with each other allowing the fluids to flow in and out of the plates without any leakage between the plates.

It is obvious, of course, that the anodes of the anode cells may all be connected in parallel and the cathodes of the cathode cells may likewise be connected in parallel to an appropriate D.C. power source as has been disclosed in the prior art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Apparatus for removing metallic and acidic contaminants from a pickling liquor comprising:
   (a) first and second cells for initially receiving water,
   (b) a third cell interposed between said first and second cells for receiving said pickle liquor,
   (c) permeable membrane means separating said third cell from said first and second cells and said membrane means being a hydrophobic, open-celled, microporous polymer membrane specially processed to provide a pore structure which provides a barrier to water and water of hydration, but which permits transfer therethrough of metal ions and acid cations,
   (d) an anode mounted in one of said first and second cells, and
   (e) a cathode mounted in the other of said first and second cells whereby when a D.C. current is passed between said anode and cathode, a metallic complex is formed at said cathode, a purified acid is formed at said anode and purified pickle liquor is left in said center cell.

2. Apparatus for removing metallic and acidic contaminants from a pickling liquor comprising:
   (a) a plurality of individual cells for receiving said pickle liquor,
   (b) a water receiving cell interposed between any two of said pickle liquor cells,
   (c) permeable membrane means separating said pickle liquor cells from said water cells,
   (d) a current receiving anode mounted in alternate ones of said water receiving cells, and
   (e) a current receiving cathode mounted in the remaining alternate water receiving cells whereby an array of cells is formed with every other cell a pickle liquor cell and the remaining cells are alternating positive and negative cells.

3. Apparatus as in claim 2 wherein each cell comprises:
   (a) an open rectangular frame having a liquid inlet and a liquid outlet.

4. Apparatus as in claim 3 further including:
   (a) means for maintaining an array of cells together in a liquid-tight relationship.

5. Apparatus as in claim 4 further including:
   (a) spacing means inserted in said pickle liquor cells to prevent said membranes from collapsing.

6. Apparatus as in claim 5 further including:
(a) means coupling said anode cell inputs in parallel to a water supply,
(b) means coupling said cathode cells in parallel to a water supply and,
(c) means coupling at least a predetermined number of said pickle liquor cells in series to a spent pickle liquor supply.

7. Apparatus as in claim 4 wherein said membrane means comprises:

(a) a single membrane folded over each pickle liquor cell to provide a liquid separation from each cell on either side of said pickle liquor cell.

8. Apparatus as in claim 5 wherein said spacing means comprise:
(a) a plurality of balls having a diameter equal to or less than the thickness of said pickle liquor cell.

9. Apparatus as in claim 6 further including:
(a) means coupling said pickle liquor supply in parallel to said pickle liquor cells in excess of said predetermined number.

10. Apparatus as in claim 9 wherein:
(a) said predetermined number of pickle liquor cells is 4.